United States Patent
Glebov et al.

(10) Patent No.: US 6,898,343 B2
(45) Date of Patent: May 24, 2005

(54) OPTICAL SWITCHING APPARATUS AND METHOD FOR FABRICATING

(75) Inventors: Alexei Glebov, San Bruno, CA (US); Michael Peters, Santa Clara, CA (US); Michael Lee, San Jose, CA (US); James Roman, Sunnyvale, CA (US); David Kudzuma, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 09/932,526

(22) Filed: Aug. 17, 2001

(65) Prior Publication Data
US 2003/0035614 A1 Feb. 20, 2003

(51) Int. Cl.[7] ............................................. G02B 6/42
(52) U.S. Cl. ......................................................... 385/21
(58) Field of Search .............................. 385/21, 24, 129, 385/146, 50, 132, 147, 7, 14, 17–8, 123, 115–116

(56) References Cited

U.S. PATENT DOCUMENTS

| 4,286,838 A | 9/1981 | Huignard et al. | |
|---|---|---|---|
| 4,850,044 A | 7/1989 | Block et al. | 455/607 |
| 5,010,505 A | 4/1991 | Falk et al. | 364/713 |
| 5,013,494 A | 5/1991 | Kubo et al. | 264/1.3 |
| 5,054,872 A | 10/1991 | Fan et al. | 385/130 |
| 5,093,890 A | 3/1992 | Bregman et al. | 385/146 |
| 5,103,494 A | 4/1992 | Mozer | 385/14 |
| 5,131,060 A | 7/1992 | Sakata | |
| 5,204,866 A | 4/1993 | Block et al. | 372/27 |
| 5,218,654 A | 6/1993 | Sauter | 385/24 |
| 5,220,582 A | 6/1993 | Kaharu et al. | 375/55 |
| 5,319,725 A | 6/1994 | Buchmann et al. | |
| 5,321,498 A | 6/1994 | Sung et al. | |
| 5,375,184 A | 12/1994 | Sullivan | 385/129 |
| 5,408,568 A | 4/1995 | Hamilton | 385/132 |

(Continued)

FOREIGN PATENT DOCUMENTS

| JP | 5-114245 | 5/1993 |
|---|---|---|
| JP | 5-224046 | 9/1993 |
| JP | 5-224245 | 9/1993 |

Primary Examiner—J. F. Duverne
(74) Attorney, Agent, or Firm—Sheppard Mullin Richter & Hampton LLP

(57) ABSTRACT

A hybrid integration process for fabrication of an optical cross-connect switching apparatus. The switching element is based on the deflection of light beam in electro-optic materials by applying electric field across electrodes of an appropriate configuration. The integration process includes fabrication of a substrate (e.g. silicon substrate) with 2D imaging optics from polymeric materials (or silica), fabrication of the light deflecting element, and assembly of the deflecting element on the substrate with imaging optics. The fabrication of the light deflecting element includes fabrication of a LN (lithium niobate) block. The LN block assembled in an optical switching apparatus includes a two-dimensional waveguide formed on a surface of the LN block and an electrode on a surface of the LN block.

10 Claims, 8 Drawing Sheets

U.S. PATENT DOCUMENTS

| | | |
|---|---|---|
| 5,465,860 A | 11/1995 | Fujimoto et al. ............ 216/24 |
| 5,483,609 A | 1/1996 | Nakaya |
| 5,488,678 A | 1/1996 | Taneya et al. |
| 5,540,346 A | 7/1996 | Fujimoto et al. ............ 216/24 |
| 5,541,039 A | 7/1996 | McFarland et al. ......... 430/290 |
| 5,572,540 A | 11/1996 | Cheng ........................ 372/50 |
| 5,581,643 A | 12/1996 | Wu |
| 5,596,671 A * | 1/1997 | Rockwell, III .............. 385/147 |
| 5,732,177 A | 3/1998 | Deacon et al. .............. 385/122 |
| 5,757,989 A | 5/1998 | Yoshimura et al. ........... 385/14 |
| 5,822,475 A | 10/1998 | Hirota et al. ................. 385/24 |
| 5,835,646 A | 11/1998 | Yoshimura et al. ........... 385/14 |
| 5,848,084 A | 12/1998 | Rokugawa |
| 5,854,868 A | 12/1998 | Yoshimura et al. ........... 385/50 |
| 5,894,538 A | 4/1999 | Presby ........................ 385/129 |
| 5,901,258 A | 5/1999 | Nuang |
| 5,907,646 A | 5/1999 | Kitamura |
| 5,909,524 A * | 6/1999 | Tabuchi ....................... 385/49 |
| 5,978,524 A | 11/1999 | Bischel et al. ................. 385/4 |
| 6,021,149 A | 2/2000 | Miyazaki et al. |
| 6,052,498 A | 4/2000 | Paniccia |
| 6,078,717 A * | 6/2000 | Nashimoto et al. ......... 385/130 |
| 6,097,857 A | 8/2000 | Feldman |
| 6,111,995 A | 8/2000 | Iwasaki et al. |
| 6,112,002 A | 8/2000 | Tabuchi et al. |
| 6,141,465 A | 10/2000 | Bischel et al. ................. 385/4 |
| 6,154,302 A | 11/2000 | Yagi et al. |

\* cited by examiner

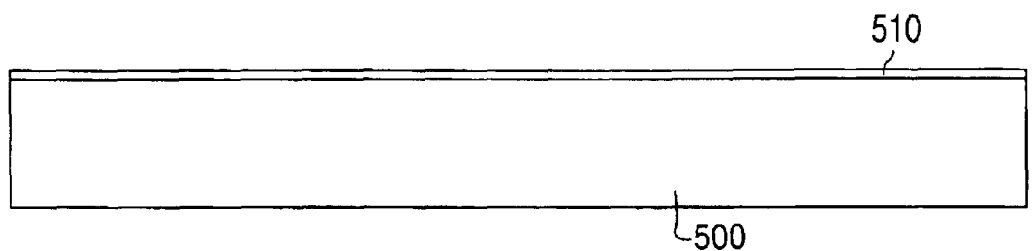
FIG. 3A
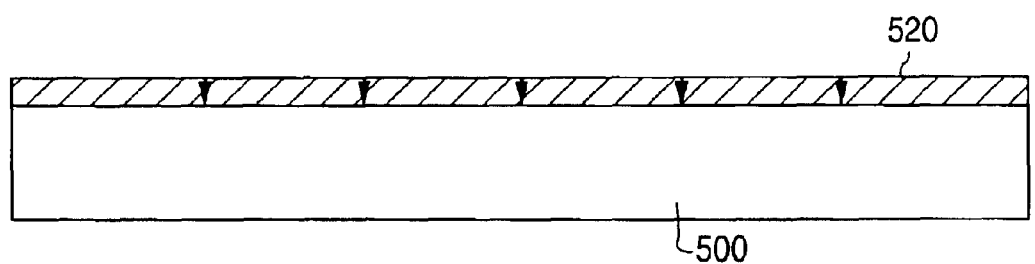
FIG. 3B
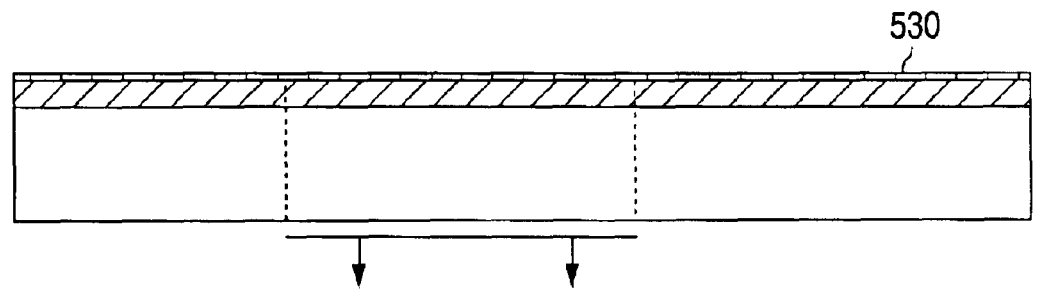
FIG. 3C
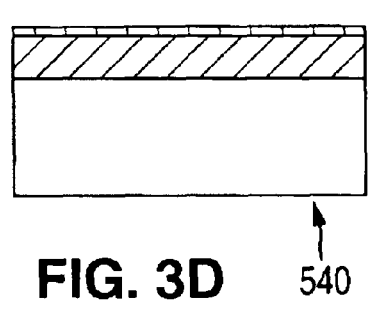
FIG. 3D
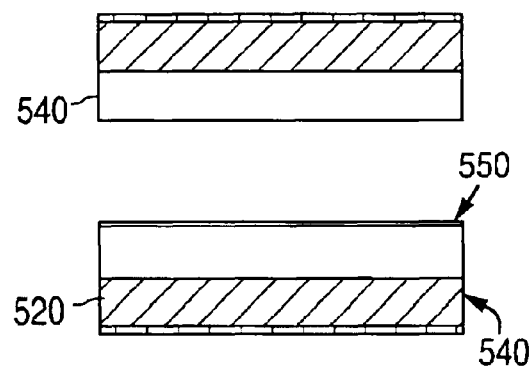
FIG. 3E
FIG. 3F

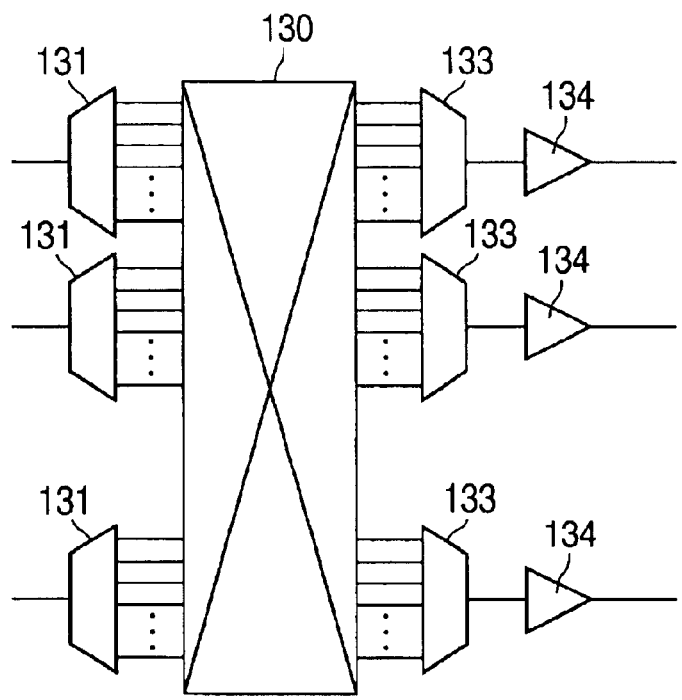
FIG. 10
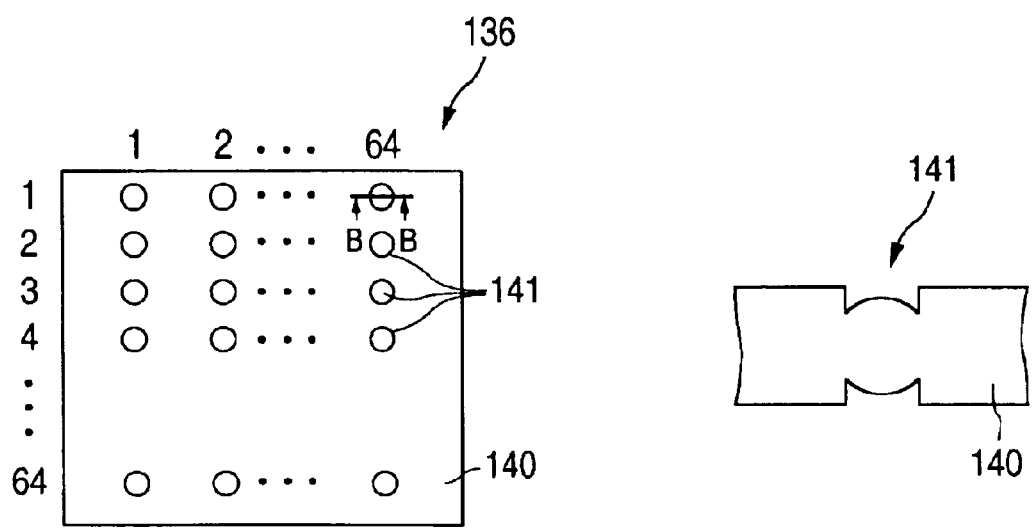
FIG. 11A  FIG. 11B

OPTICAL SWITCHING APPARATUS AND METHOD FOR FABRICATING

BACKGROUND OF THE INVENTION

1. Field of the Invention

This invention is related to an optical switching apparatus used in an optical network for voice and data communications. More particularly, embodiments of the present invention provide for an optical switching device and method for fabricating, forming or producing an optical cross-connect switching device.

2. Description of the Related Art

Strong growth of optical networks for voice and data communication results in huge demand for high data rate information transfer capabilities. To enable such transfer capabilities, dense wavelength division multiplexing (DWDM) technology has been developed which allows transfer of multiple wavelength over the same fiber leading to data transfer rates up to 40–100 Gb/s. High speed switching and routing devices comprise the core elements of the optical networks and allow dynamic control of the data traveling over the optical network. Furthermore, high data transmission rates impose strong requirements on the functionality of the switching devices.

Optical cross-connect space division switches based on optic-electro (OE) deflection of the light beam have great potential for future implementation in high speed optical networks. One of the basic concerns is the switching time and a capability of handling a great number of input and output channels, e.g., up to 4000×4000 by the year 2003, as well as reliability and cost factors. Existing optical switching devices which employ signal conversion from optical into electrical and back into optical do not satisfy those requirements. Having very low switching times switching matrixes can be designed to connect very large number of input and output (I/O) ports. Such switches may be built from an assembly of simple digital optical switches where each can redirect one input signal into two possible output ports. However, optical cross-connect switching elements are more useful for large-scale implementations. These devices require large-scale monolithic switch arrays to perform switching functions. Although, the main principle of the optical cross connect switching based on the light beam deflection is well known, a robust, reliable, low cost and extendable integration process for such type of switching device is not available.

Currently, the main optical switching products on the market (e.g. Lucent's Lambda-router) are based on MEO-NIS technology, which employs rotating micro-mirrors to deflect light. However, these optical switching devices are not very reliable due to many moving parts, and also the switching time is limited by the mechanics of the mirrors. It is desirable to improve the reliability of the many moving parts of the optical switching devices and to overcome the limitation of the switching time in these devices due to the mechanics of the micro-mirrors.

There are several other optical switching technologies which are still not well represented in the market due to various technological and economic difficulties. Such optical switching technologies include by way of example only: the bubble switch from Agilent Technologies Inc., switches based on liquid crystals, and thermo-optic and electro-optic (EO) effects, etc. Most of these devices are still in the R&D stage. Some of those technologies including EO switches may be applicable for high speed, low cost, high reliability, and high I/O port count products. However, as of today no proven technology has been developed which can satisfy the above-mentioned requirements.

Therefore, what is needed and what has been invented is an improved optical switching device and method for fabricating the improved optical switching device. What is further needed and what has been invented is an integration process which allows for fabrication of a non-blocking optical cross-connecting switching matrix possessing a large number of input and output channels.

SUMMARY OF THE INVENTION

Embodiments of the present invention provide a hybrid integration process for fabrication of an optical cross-connect switching device. The switching element is based on the deflection of light beam in electro-optic materials by applying electric field across electrodes of an appropriate configuration, e.g. prisms, gratings, etc. The integration process includes fabrication of a substrate, e.g. silicon substrate, with 2D (two-dimensional) imaging optics from polymeric materials or silica, fabrication of the light deflecting element, and assembly of the deflecting element on the substrate with imaging optics. The fabrication of the light deflecting element includes fabrication of a LN (lithium niobate) block. The LN block assembled in an optical switching apparatus includes a two-dimensional waveguide formed on a surface of the LN block and an electrode on a surface of the LN block.

Embodiments of the present invention further provide a method for producing an optical substrate assembly comprising providing a substrate; disposing a first cladding layer on the substrate; forming a first recess in the first cladding layer; disposing a plurality of first deflector electrode assemblies in the first recess; disposing a core layer on the first cladding layer and over the first electrode assemblies; and forming microlenses in the core layer to produce an optical substrate assembly. The foregoing method additionally comprises forming an alignment frame assembly in the core layer. Forming of the alignment frame assembly includes forming a plurality of spaced corner assemblies and etching openings in the first cladding layer down to the substrate. The openings may border on the first recess. The foregoing method additionally comprises depositing a protective layer in the first recess.

Embodiments of the present invention also further provide a method for producing an optical switching apparatus comprising providing a substrate; disposing a first cladding layer on the substrate; disposing a plurality of first deflector electrode assemblies on the first cladding layer; disposing a core layer on the first cladding layer and over the first electrode assemblies; forming microlenses in the core layer to produce an optical substrate assembly; forming an alignment frame assembly in the core layer; and engaging the alignment frame assembly with an optical switching device. Forming the optical switching device comprises providing an optical switching substrate; diffusing an element into the optical switching substrate to produce a waveguide layer in the optical switching substrate; and disposing a plurality of second deflector electrode assemblies on the optical switching substrate. The optical switching substrate preferably comprises $LiNbO_3$, and the element preferably comprises a transitional metal, such as titanium. Forming an alignment frame assembly includes etching openings in the first cladding layer down to the substrate. The openings preferably border on the first recess, and the alignment frame assembly includes a plurality of spaced corner assemblies. A plurality of optical output may be formed in the core layer such that optical signals are transferred directly from the microlenses to the optical output without blocking and in a crisscross fashion.

Another embodiment of the present invention provides a method for producing an optical switching device comprising providing an unblocking optical switching substrate; diffusing an element into the optical switching substrate to produce a waveguide layer in the unblocking optical switching substrate; and disposing deflector electrodes on the unblocking optical switching substrate.

A further embodiment of the present invention provides a method for producing an optical switching apparatus comprising providing a substrate; disposing a first cladding layer on the substrate; disposing a core layer on the first cladding layer; forming microlenses in the core layer; forming an alignment frame assembly in the core layer; and engaging the alignment frame assembly with an optical switching device. For this embodiment of the invention, forming the optical switching device comprises providing an optical switching substrate; diffusing an element into the optical switching substrate to produce a waveguide layer in the optical switching substrate; disposing a plurality of first deflector electrode assemblies on the optical switching substrate; disposing a second cladding layer on the waveguide layer in the optical switching substrate; and disposing a plurality of second deflector electrode assemblies on the waveguide layer.

Additional embodiments of the present invention provide an optical substrate assembly and an optical switching apparatus. The optical substrate assembly includes a substrate; a first cladding layer disposed on the substrate; a plurality of deflector electrode assemblies supported by the first cladding layer; microlenses formed in the core layer; an alignment frame assembly formed in the core layer; and an optical switching device engaged to the alignment frame assembly. The optical switching apparatus comprises an optical switching substrate, which is preferably optically unblocking, including a waveguide layer produced by diffusing an element (e.g., a transitional element, such as titanium) into the optical switching device; and a plurality of second deflector electrode assemblies.

A method for transmitting a plurality of unblocked optical signals is also provided by embodiments of the present invention. The method for transmitting comprises the steps of:

a) forming an optical substrate assembly having an alignment frame assembly and a first core layer defining a plurality of microlenses and a second core layer spaced from and aligned with the first core layer and including a plurality of optical outputs;

b) forming an optical switching device possessing unblocking optical capabilities and having an optical waveguide layer;

c) engaging the alignment frame assembly with the optical switching device such that the optical waveguide layer is aligned with the first core layer and the second core layer; and d) transmitting unblocked optical signals from the plurality of microlenses, through the optical switching device, and to the plurality of optical outputs.

These provisions together with the various ancillary provisions and features which will become apparent to those skilled in the art as the following description proceeds, are attained by the optical switching apparatus and method of the present invention, preferred embodiments thereof being shown with reference to the accompanying drawings, by way of example only, wherein:

BRIEF DESCRIPTION OF DRAWINGS

FIGS. 3(A)–3(F) illustrate a process flow of fabrication of the deflecting device.

FIG. 10 illustrates a schematic diagram of the light signal switching apparatus shown in FIG. 9.

FIGS. 11(A) and 11(B) show a structure of a light connector.

DETAILED DESCRIPTION OF PREFERRED EMBODIMENTS OF THE PRESENT INVENTION

Figure 1A:
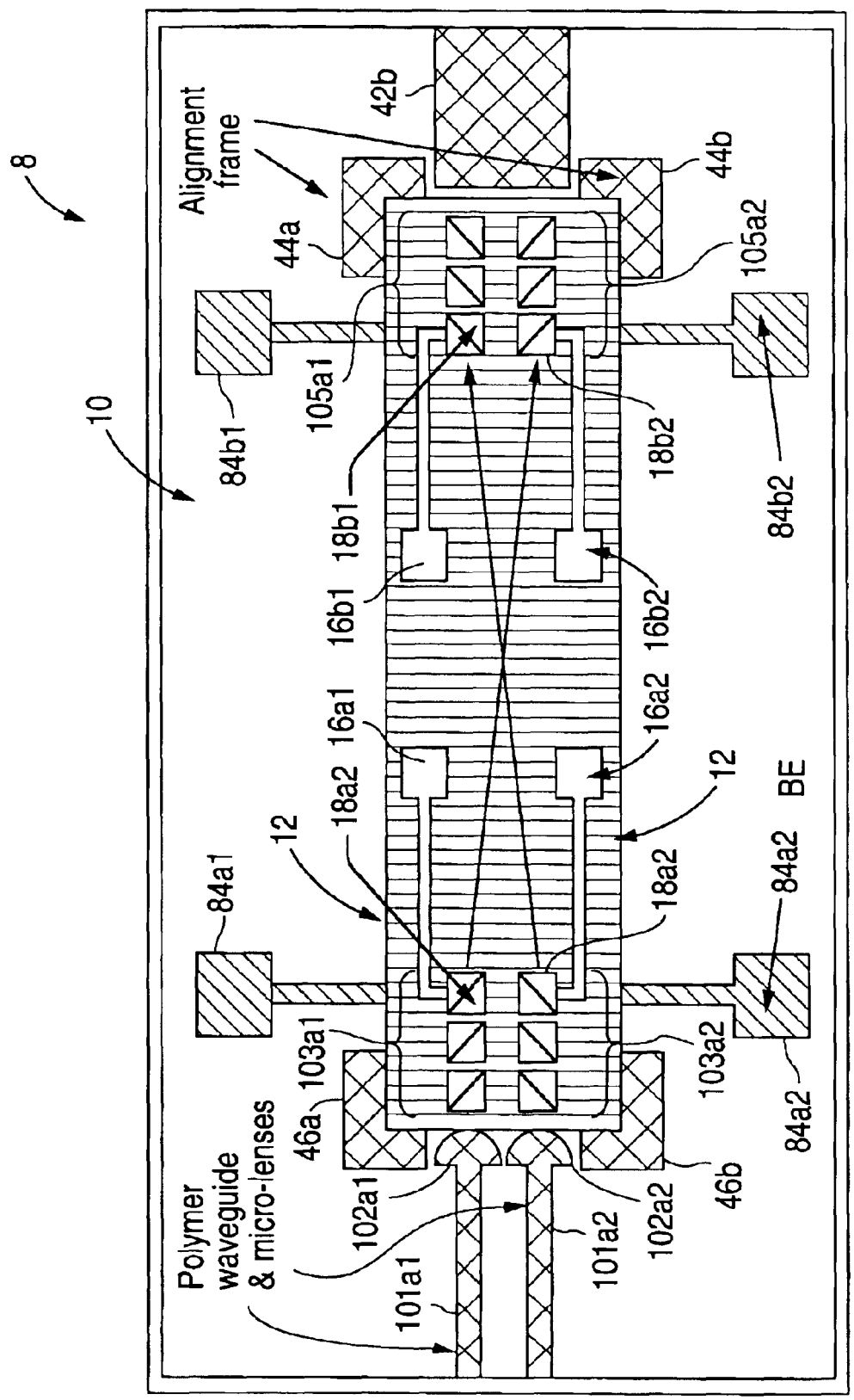
FIGS. 1(A) and 1(B) illustrate top and side views of an integrated (2×2) cross-connect optical switch.

Referring in detail now to the drawings in combination with the detailed description hereinafter presented, there is illustrated and described an integration process, which allows fabrication of a non-blocking optical cross connect switching matrix with a large (e.g., at least up to 4000) number of I/O channels. The functional principle of the device is based on the EO induced deflection of the incoming optical beam or optical signal that can reroute the incoming light signal from an input port to an output port. Physical principle of the EO induced light beam deflection in piezoelectric materials is well known and is described in an article entitled "Low-Voltage Drive Electro-Optic Pb (Zr, Ti) $O_3$ Waveguide Devices Fabricated By Solid-Phase Epitaxy" to Nashimoto et al of the Corporate Research Laboratories of Fuji Xerox Co., Ltd., Japan.

Embodiments of the present invention provide a hybrid integration process including an OE deflecting element disposed on a silicon substrate, allowing fabrication of a (2×2) cross-connect switching device. The (2×2) cross-connect switching device is used for illustration only, and embodiments of the integration process can easily be extended to fabricate switching systems with much larger number of I/O ports, such as 4000×4000 input/output ports. The silicon substrate is employed to exemplify the process. Therefore, the silicon substrate may be replaced by any other substrate, e.g., glass plate, printed circuit board, etc., which may be chosen according to the design requirements. The switching element or device in the present example is made from $LiNbO_3$ (lithium niobate, hereinafter termed as "LN") with a transitional metal (e.g., Ti) in-diffused waveguide and with top and bottom electrodes having a prism shape. It is to be understood that LN may be replaced by any material with a strong electro-optical coefficient. The material may be either a bulk or thin film material and the electrodes may be made in various shapes, such as prisms, gratings, various combinations and arrays of prisms and gratings, etc. Thus, LN means not only lithium niobate, but also other suitable electro-optic material to be formed as a wafer. Whole structures of an optical switching device and deflectors which implement the present invention are described in a Japanese patent application number Tokugan 2001040006, filed on Feb. 16, 2001 and a Japanese patent application number Tokugan 2001-56009, filed on Feb. 28, 2001. Waveguide circuits and/or optical signal routing and switching are described in the following U.S. Patents which are fully incorporated herein by reference thereto as if repeated verbatim immediately hereinafter: U.S. Pat. No. 6,141,465 to Bischel et al.; U.S. Pat. No. 5,572,540 to Cheng.; U.S. Pat. No. 5,103,494 to Mozer; U.S. Pat. No. 5,894,538 to Presby; U.S. Pat. No. 5,854,868 to Yoshimura et al.; U.S. Pat. No. 5,465,860 to Fujimoto et al.; U.S. Pat. No. 5,835,646 to Yoshimura et al.; U.S. Pat. No. 5,540,346 to Fujimoto et al.; U.S. Pat. No. 5,220,582 to Kaharu et al.; U.S. Pat. No. 5,218,654 to Sauter; U.S. Pat. No. 5,093,890 to Bregman et al.; U.S. Pat. No. 5,822,475 to Hirota et al.; U.S. Pat. No. 5,204,866 to Block et al.; U.S. Pat. No. 5,010,505 to Falk et al.; U.S. Pat. No. 4,850,044 to Block et al.; U.S. Pat. No. 5,375,184 to Sullivan; U.S. Pat. No. 5,757,989 to Yoshimura et al.; U.S. Pat. No. 5,757,989 to Yoshimura et al.; U.S. Pat. No. 5,541,039 to McFarland et al.; U.S. Pat. No. 5,054,872 to Fan et al.; U.S. Pat. No. 5,978,524 to Bischel et al.; U.S. Pat. No. 5,732,177 to Deacon et al.; U.S. Pat. No. 5,488,735 to Tanabe et al.; and U.S. Pat. No. 5,408,568 to Hamilton et al.

Figure 4:
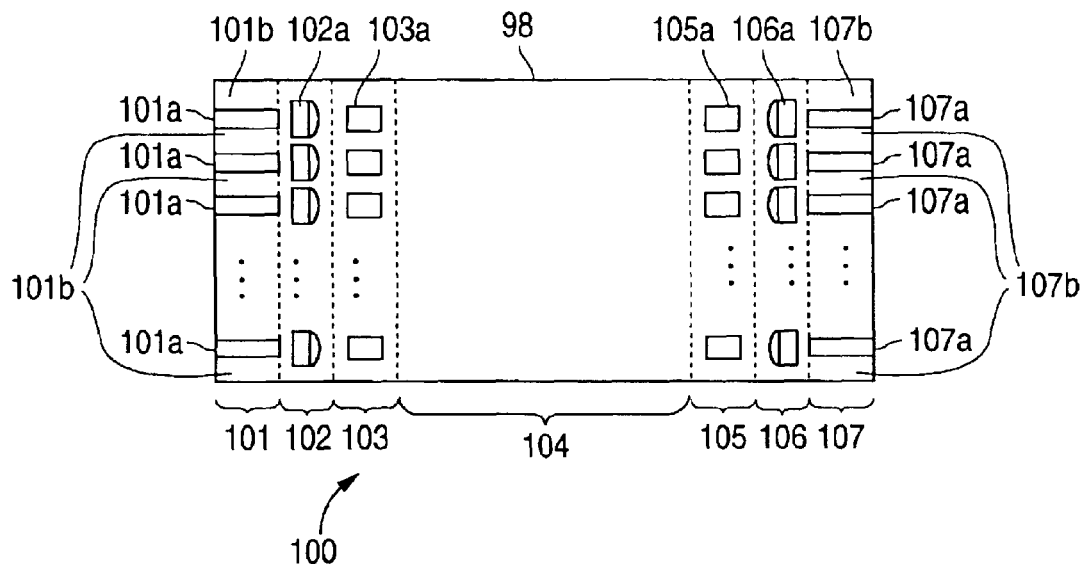
FIG. 4 illustrates a schematic diagram showing an optical switch module.

Referring now to FIG. 4 there is seen a schematic diagram showing an optical switch module, generally illustrated as 100. The optical switch module 100 is constructed by an input side optical waveguide portion 101, an input side collimating portion 102, an input side deflecting portion 103, a common optical waveguide portion 104, an output side deflecting portion 105, a focusing portion 106, and an outside optical waveguide portion 107. The input side optical waveguide portion 101, the input side collimating portion 102, thus input side deflecting portion 103, the common optical waveguide portion 104, the output side deflecting portion 105, the focusing portion 106, and the outside optical waveguide portion 107 are all integrally formed on a substrate 98. The input side optical waveguide 101 is constructed of a plurality of optical waveguides, so called cores, 101a—101a, and clad layers 101b which cover and are selectively disposed between the plurality of optical waveguides 101a—101a, and keeps an optical beam lightwave within optical signal or respective optical waveguides 101a—101a by using the difference of refractive index between the waveguide 101a and the clad layer 101b. The output side of waveguide 107 is similar to the structure of the input side of waveguide 101 and is constructed of a plurality of optical waveguides, so called cores, 107a—107a, and clad layers 107b which cover and are selectively disposed between the plurality of optical waveguides 107a—107a, and keeps an optical beam, or optical signal, or light wave within respective optical waveguides 107a—107a by using the difference of refractive index between respective waveguides 107a and respective clad layers 107b.

As shown in FIG. 4, the number of the optical waveguides 101a of the input side of optical waveguide 101 is equal to the number of the optical waveguides 107a of the output side of optical waveguide 107. Herein after, the number of the optical waveguides 101a and the number of the optical waveguides 107a are referred as "n". Here, "n" is an integer having a value of two or more. In another embodiment of the invention, and by way of example only, it is to be understood that the number of the optical waveguides 101a of the input side of optical waveguide 101 may be different from the number of the optical waveguide 107a of the output side of optical waveguide 107.

The collimating portion 102 is comprised of "n" number of microlenses or collimating lenses 102a. Each of the collimating lenses 102a is located at a position slightly apart from the end portion of respective optical waveguides 101a. The light output from optical waveguides 101a is initially broadened out or scattered out in a radical manner, but then it becomes a collimatingd confined, or registered light in the collimating lens 102a.

In the input side deflection portion 103, "n" number of light deflection elements 103a is provided. Each of the light deflection elements 103a is positioned at a location slightly apart in a light axis direction from respective collimating lens 102a. The light deflection element 103a deflects or changes the propagation direction of light signal by using Pockels cell effect, namely an electro-optic effect.

The common optical waveguide 104 is constructed by a slab type waveguide. The common optical waveguide 104 transmits a light that passed through the input side light deflection portion 103 to the output side light deflection portion 105. Within the common waveguide 104, plural optical signals pass through at the same time. Since these optical signals straightforwardly move in a predetermined direction within the common waveguide 104, the plural optical signals are transmitted without interfering or distorting each other. In other words, there is no criss-crossing of optical signals.

At the output side light deflection element portion 105, "n" number of light deflection elements 105a—105a are provided. These light deflection elements 105a—105a deflect, change, or alter an optical beam, optical signal, or a light wave that the light deflection elements 105a receive after passing through the common optical wave guide 104. Light deflection elements 105a, respectively, change direction of respective optical beams to a direction parallel to the optical axis direction of corresponding respective optical waveguides 107a. In a preferred embodiment of the direction, both light deflection elements 103a and 105a have generally the same structure.

The focusing portion 106 is comprised of "n" number of focusing lenses 106a—106a. These focusing lenses 106a—106a function to guide a light signal that passes through the respective light deflection element 105a to the optical waveguide 107a by focusing the light signal.

The waveguides or cores may be manufactured of any suitable material. For example, the waveguides may be formed using a highly transparent, highly heat-resistant polymer such as a fluorinated polyimide, or quartz or another glass or polymer material. The same type of material may also be used for the cladding layers, or an organic and/or inorganic hybrid may be used. The film forming method for these polymer systems may be spin coating, dip coating, spray coating, or a vapor phase growth process such as evaporation polymerization or CVD. For glass systems, sputtering, evaporation, CVD, ion plating or the like may be employed, and when a sol-gel method is used, spin coating, dip coating or spray coating may be employed.

Figure 5:
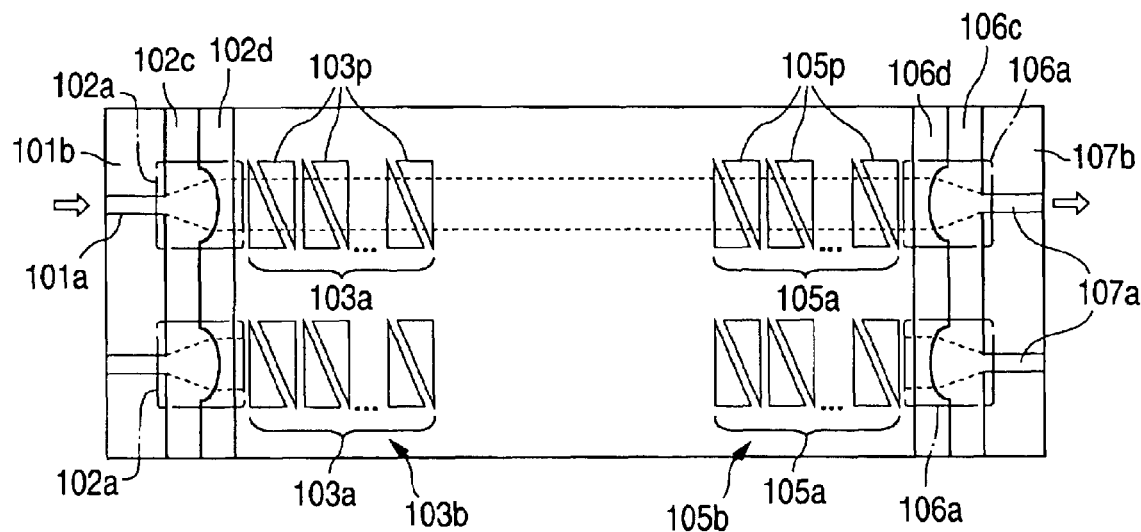
FIGS. 5 and 6 illustrate the detailed structure of parts of the optical switch module.
Figure 6:
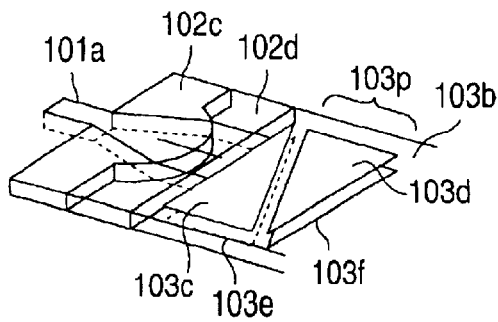

Referring now to FIGS. 5 and 6, there is seen the detailed structure of parts of the optical switch module 100. The details of the collimating lens portion 102, the input side light deflection element portion 103, the output side light deflection element portion 105, and the focusing portion 106 in the optical switch module are explained with reference to FIGS. 5 and 6.

The collimating lenses 102a—102a, which are constructed of the same material as the collimating portion 102, as shown in FIGS. 5 and 6, are preferably a two-dimensional lens comprised of two portions 102c and 102d, each portion having a different refractive rate or index from each the other. The portion 102c, having a high refractive rate (a convex lens portion), is preferably formed by the same material used for forming the optical waveguides 101a and 107a, so-called core. The portions 106d and 102d, having a low refractive rate, are preferably an opening, air, or any suitable index matching material (e.g., gels) having a refractive index lower than the refractive index of the core (e.g., portions 102c and 106c).

The focusing lenses 106a—106a of the focusing portion 106 are similar to the collimating lens 102a. Each focusing lenses 106a includes a portion (a convex lens portion) 106c having a high refractive rate and the portion 106d having a low refractive rate. Preferably, the refractive direction of focusing lenses 106a–106a is opposite to the refractive direction of collimating lenses 102a—102a.

The light deflection elements 103a—103a, constructed as part of the input side light deflection portion 103, comprise one or more prism pairs 103p—103p. One prism pair 103p, as shown in FIG. 6, includes a slab type waveguide 103b made from a material having electro-optic effects. As further best shown in FIG. 6, the first and second upper electrodes 103c and 103d are formed on the upper side of slab type waveguide 103b, and first and second lower electrodes 103e and 103f are formed on the lower side of slab type waveguide 103b. The first and second upper electrodes 103c and 103d and these first and second lower electrodes 103e and 103f are formed in a shape of a triangle (a wedge shape), respectively.

The first upper electrode 103c and the first lower electrode 103e are opposed and face each other while holding the slab type waveguide 103b therebetween. The first upper electrode 103c and the second upper electrode 103d are spaced and face each other along an oblique side associated with each of the upper electrodes 103c and 103d. The second upper electrode 103d and the second lower electrode 103e are also opposed and face each other while holding the slab type waveguide 103b herebetween. Thus, the slab type waveguide 103b is common for each prism pair 103p. By using such a structure for each prism pair 103p, the size of each prism pair may be smaller.

Continuing to refer to FIG. 5, the light deflection elements 105a—105a of the output side light deflection portion 105 are similar to the input side light deflection elements 103a—103a, and include the slab type waveguide 105b made from a material having the characteristic of electro-optic effects, and one or more prism pairs 105p—105p. Each of the prism pairs 105p is identical to each of the prism pairs 103p, and more specifically includes a pair of first electrodes (not shown), but which correspond to and are essentially identical to the first upper electrode 103c and the first lower electrode 103e respectively, and a pair of second electrodes (not shown), but which correspond to and are essentially identical to the second upper electrode 103d and the second lower electrode 103f, respectively. Since they are identical to the electrodes for prism pair 103p, the first and second upper electrodes and the first and second lower electrodes for the prism pair 105p are formed into a shape of a triangle (a wedge shape), respectively.

Figure 7A:
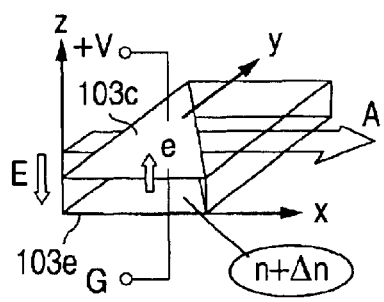
FIGS. 7(A) and 7(B) illustrate a schematic diagram for showing deflection of light of a prism pair.
Figure 7B:
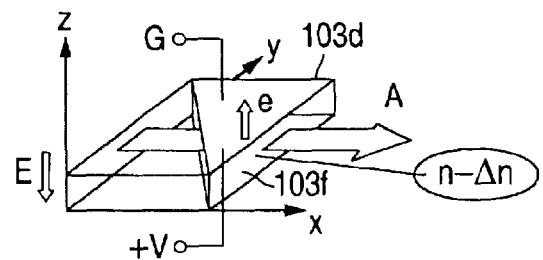

Referring now to FIGS. 7(A) and 7(B) a schematic diagram is seen for illustrating deflection of light of prism pair 103p (i.e., electrodes 103c and 103e and electrodes 103d and 103f). In FIG. 7, arrow A indicates a direction of an axis of crystallization of the slab type waveguide 103b and arrow E indicates a direction of electronic field applied to the prism pair 103p.

As shown in FIG. 7(A), the first lower electrode 103e is connected to the ground line (G). In this state, when a control voltage (+V) is applied to the first upper electrode 103c, the refractive rate of the slab type waveguide 103b between the first upper electrode 103c and the first lower electrode 103e changes from n to n+Δn. Thus, the transmission direction A of light signal is deflected to left-hand side direction in view of the moving direction of the light signal at an angle θ. On the other hand, in a state that the second upper electrode 103d is connected to the ground line (G) as shown in FIG. 7(B), where a control voltage (+V) is applied to the second lower electrode 103f, the refractive rate of the slab type waveguide 103b located between the upper electrode 103d and the lower electrode 103f changes from n to n−Δn. Thus, the transmission direction A of light signal is further deflected to the left-hand side direction in view of the transmitted direction of the light signal at an angle θ. Hereinafter, these electrodes to which the control voltage is applied may also be called control electrodes, which correspond to the first upper electrode 103c and the second lower electrode 103f.

Therefore, a light signal can be deflected at an angle 2θ with one prism pair. Obviously, where "m" number of prism pairs 103p are located in tandem in each of the channels with "m" being an integer having a value of two or more, the deflection direction from the transmission direction of the light signal can be 2θ×m. The electrodes pinching the slab type waveguide made by a material with the characteristic of electro-optic effect between the electrodes may be formed to directly contact with the slab type waveguide (a core layer). In this modification, a clad layer inserted between these electrodes and the slab type waveguide (a core layer) avoids the loss of light due to the transmission from a metallic boundary surface.

Figure 8:
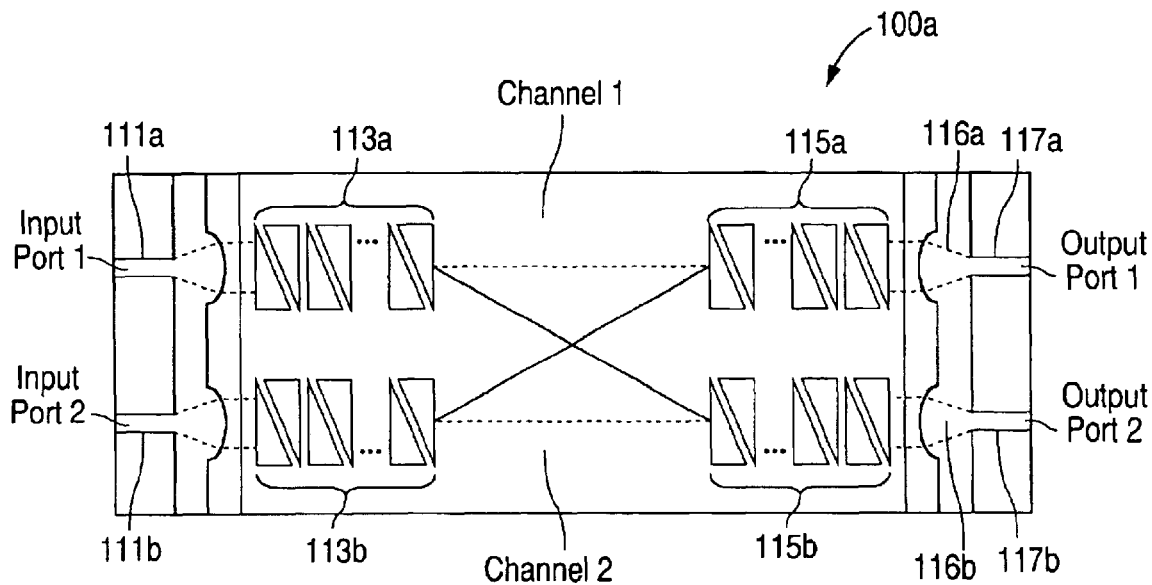
FIG. 8 shows a 2 by 2 channel optical switch module.

Referring now to FIG. 8, there is seen a 2×2 channel optical switch module 100a. The optical switch module 100a transmits the first light signal input into the first input port 1 to either output port 1 or to the output port 2. The second light signal input into the first input port 2 is transmitted to the remaining output port not receiving the first light signal, which is output port 1 or output port 2. Thus, if output port 2 receives the first light signal from input port 1, output port 1 would receive the second light signal from input port 2. When there is no criss-crossing of optical signals, such as where a light signal input into the first input port 1 is transmitted to the output port 1, and a light signal input into the second input port 2 is transmitted to the output port 2, a control voltage is not applied to any of the light deflection elements 113a, 113b, 115a, and 115b, and thus, no light signals are deflected at the light deflection elements 113a, 113b, 115a, and 115b. Accordingly, the light signal input into channel waveguide 111a would be transmitted to light waveguide 117a, and the light signal input into channel waveguide 111b would be transmitted to light waveguide 117b, all without any optical criss-crossing due to any applied control voltage.

Where a light signal input into the first input port 1 is to be transmitted to the output port 2 and a light signal input into the second input port 2 is to be transmitted to the output port 1, a plus control voltage +V would be applied to the control electrodes of the light deflection elements 113a and 115b and a minus control voltage −V would be applied to the control electrodes of the light deflection elements 113b and 115a. Accordingly, the light signal input into the input port 1 would be deflected toward the right hand direction in view of the transmission direction of the light signal at the light deflection element 113a, and then, upon reaching light deflection element 115b, the deflected light signal would be deflected again into a direction parallel to the longitudinal axis of optical waveguide 117b at light deflection element 115b, and would be focused by focusing lens 116b into the optical waveguide 117b, and then transmitted into the output port 2. Similarly, the light signal input into the input port 2 would be deflected in a left hand direction in view of the transmission direction of the light signal at the light deflection element 113b and into light deflection element 115a, and then, upon reaching light deflection element 115a, the deflected light signal would be deflected again into a direction parallel to the longitudinal axis of optical waveguide 117a at the light defection element 115a, and would then be transmitted to the output port 1 through the focusing lens 116a and the optical waveguide 117a.

Figure 9:
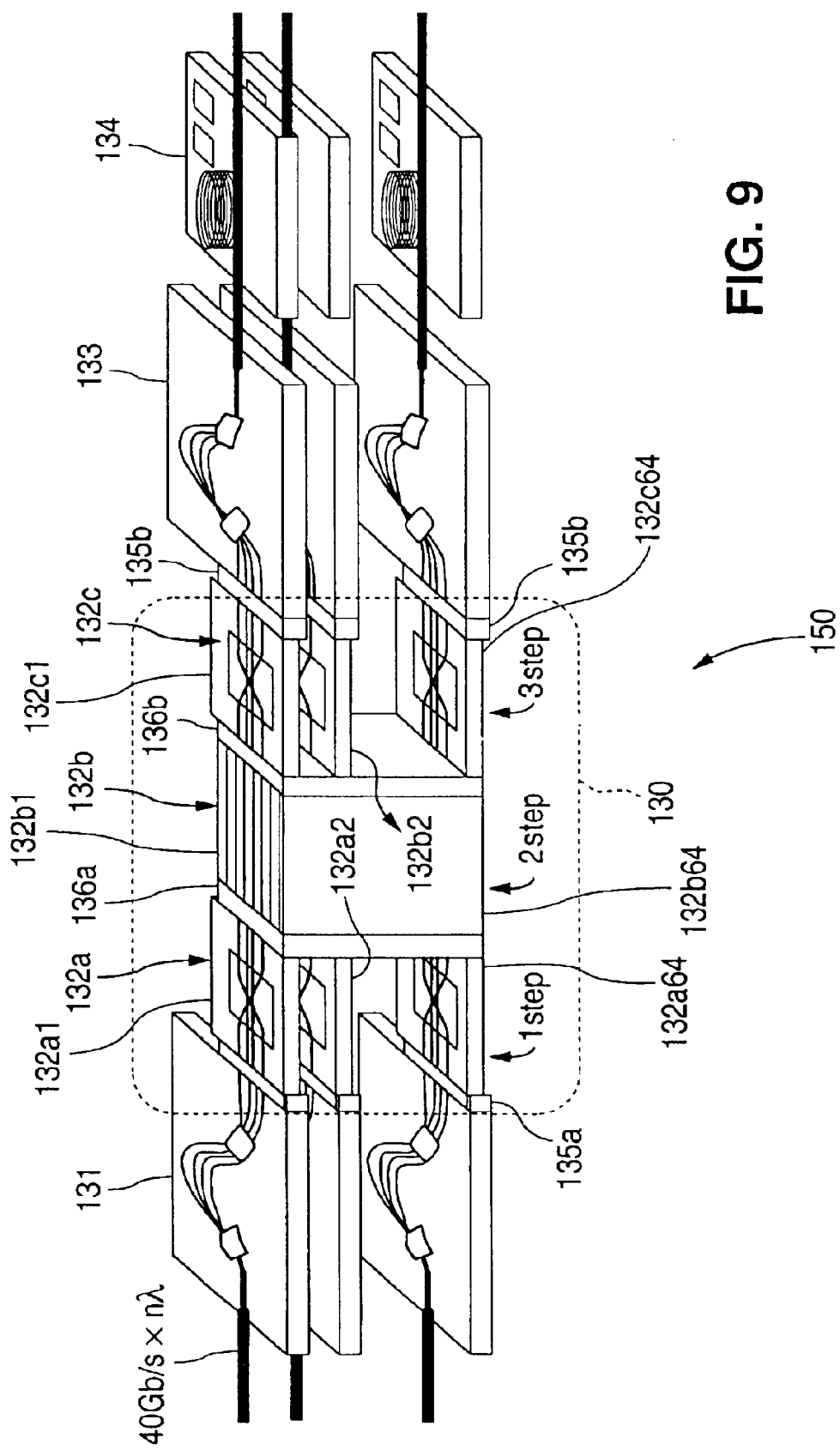
FIG. 9 illustrates a diagram for a light signal switching apparatus using the optical switch module.

Referring now to FIG. 9, a diagram is seen for a light signal switching apparatus 150 using the optical switch module 100 as described previously. FIG. 10 shows a schematic diagram of the light signal switching apparatus shown in FIG. 9. The light signal switching apparatus 150 has 64 inputs of WDM signal in which light signals for 64 wavelengths with 40 Gb/s are multiplexed. The transmittal direction of these multiplexed light signals are switched or changed in the light signal switching apparatus 150.

The light signal switching apparatus 150 comprises sixty four AWG light dividers 131 arranged along in a vertical direction in FIG. 9, a three step-structure light switch module 130, sixty four light composers 133, and sixty four light amplifiers (EDFA: Erbium Doped Fiber Amplifier) 134. In each step of the three step-structure light switch module 130, there are a plurality of light switch modules, such as optical switch module 100. More specifically, each step of the three step-structure light switch module 130 includes the plural light switch modules 132a, 132b, and 132c. Each of the plural light switch modules 132a, 132b, and 132c is constructed from sixty-four light switch modules, each having 64×64 channels. More specifically further, each of the sixty-four light switch modules includes sixty-four light input ports and sixty-four light output ports. Each of the sixty-four light switch modules are different from the FIG. 8 light switch module 100a which has two by two channels because of the number of the input ports and the number of the output ports. In the first step, the sixty-four switch modules 132a1–132a64 are arranged in a direction with the substrate of the light switch module 132a. As similar to the first step, in each second step and each third step, the sixty-four switch modules are arranged in an appropriate registry direction with the substrate of the respective light switch modules 132b and 132c. In the second step of the three step-structure light switch module 130, the sixty-four light switch modules 132b1–132b64 are located in a state or position where they are rotatably disposed at 90 degrees against and with respect to the sixty-four light switch modules 132a in the first step and the sixty-four light switch modules 132c in the third step. The sixty-four light switch module 132c in the third step is located around an axis extending along one of the channels of the light switch module 100a.

Each of the light dividers 131 and each of the light switch modules 132a in the first step are coupled by a light connector 135a. Likewise, each of the light switch modules 132a in the first step and each of light switch modules 132b in the second step are coupled by a light connector 136a. Similarly, each of the light switch modules 132b and each of the light switch module 132c are coupled by a light connector 136b, and each of the light switch modules 132c and each of the light composers 133 are coupled by a light connector 135b.

FIGS. 11(A) and (B) show a structure of the light connector 136. FIG. 11(A) shows a top plan view of the light connector 136, and FIG. 11(A) shows a vertical sectional view taken along the plane of the B—B line in FIG. 11(A). As shown in FIGS. 11(A) and (B), the light connector 136 comprises a substrate 140 having various number of tiny lenses 141 through which a light signal passes in the direction of the thickness (i.e., a vertical direction) of the substrate 140. With the light connector 136, the lenses 141 are arranged along two-dimensional directions. But with the light connector 135, lenses 141 are arranged along only a single dimensional direction. The arrangement pitch of the lenses 141 is set to the same as the interval pitch of the input ports and/or output ports of the light switching modules 132a, 132b, and 132c. The lenses 141 of these light connectors 135 and 136 focus a light output from a preceding optical device and transmit same to an immediate subsequent optical device thereof; thus, they are useful to lower the loss of transmission. In this embodiment of the optical switching device, there is a microprocessor controller for turning on and/off the voltage applied to each of the control electrodes of the light deflection elements in each of light switching modules 132a, 132b, and 132c. The microprocessor (not shown in the drawings) is coupled to each of the electrodes of the light deflection elements through a conductive wire which transmits an electronic signal from and controlled by the microprocessor.

Figure 1B:
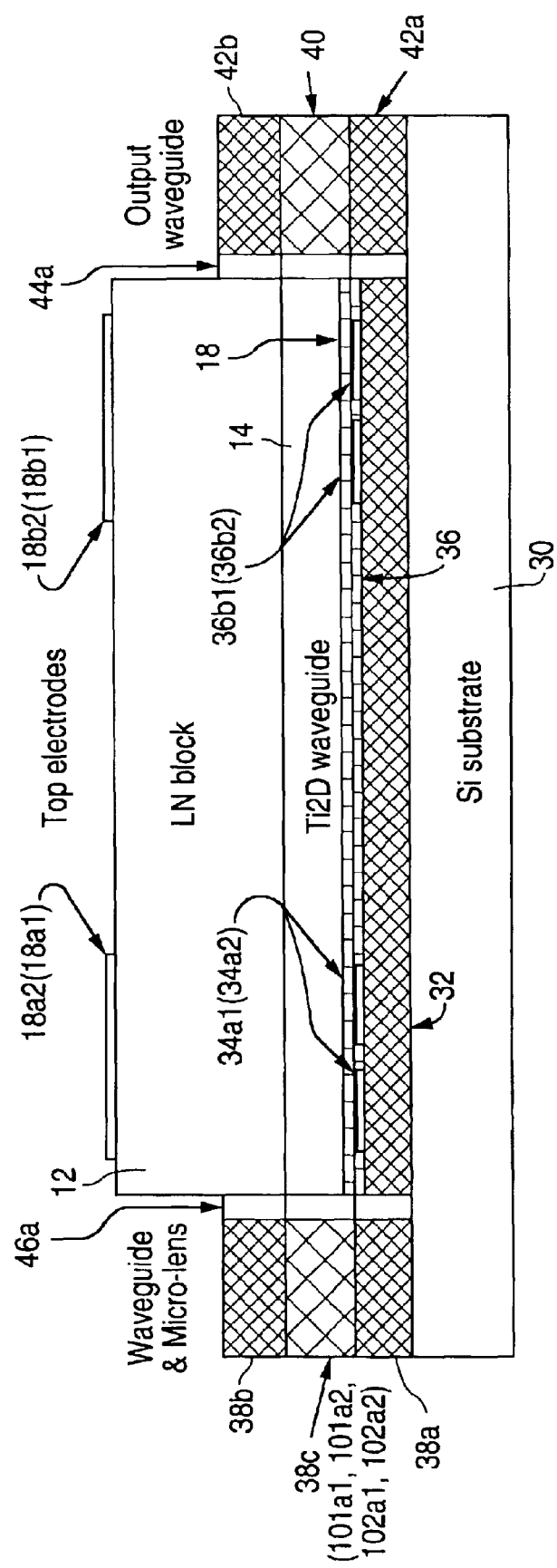

FIGS. 1(A) and (B) show top and side views of the schematic structure of an integrated (2×2) switching device 8. The switching part of the device 10 includes a LN block 12. The LN block 12 is prepared from a single crystal LN wafer in a manner described below. A two-dimensional transitional metal-diffused (e.g.,Ti-diffused) waveguide (WG) 14 is formed in the LN block 12 for vertical confinement of the transmitting light modes. The thickness of the LN block 12 may be varied from 10 to 500 µm. In FIGS. 1(A) and 1(B), the LN block 12 is placed with Ti-diffused waveguide 14 facing a silicon substrate 10, in order to align a polymer waveguide core 40 with a LN slab waveguide core 14, which is the two-dimensional Ti-diffused waveguide. The waveguide 14 functions as the previously described common waveguide.

In the case of very thin LN films, a structural embodiment is possible in which the bottom layer (i.e., a low clad polymer layer 32) is etched all the way down to the substrate 30 in order to form a recess 91 (see FIG. 2E), and the LN block 12 is placed in the recess 91 such that the waveguide region 14 (the two-dimensional Ti-diffused waveguide 14) is generally aligned with waveguide layers (identified as "38c" and "40" below) and the bottom surface of the two-dimensional Ti-diffused waveguide 14 is located equal to or slightly lower than the top surface of the low clad polymer layer 32. In another structural embodiment, the thickness of LN block 12, not including the thickness of the two-dimensional Ti-diffused waveguide 14, is the same as, or slightly wider than, or similar to the thickness of the polymer bottom cladding layer 32 and to the thickness of the core layer 40.

Therefore, and recapitulating, the LN block 12 may be placed with Ti-diffused waveguide facing the substrate 30 in order to level the polymer waveguide core (i.e., low clad polymer layer 32) with the LN slab waveguide core (i.e., Ti-diffused waveguide 14). In the case of very thin LN films, the bottom layer of the polymer waveguide core may be etched all the way down to the silicon substrate 30, and the LN block 12 may be placed with the waveguiding region up, assuming that the thickness of the LN is similar to the thickness of the polymer bottom cladding and the core.

Optical fibers, not shown in FIGS. 1(A) and (B), transmitting the light signals are coupled, at the right hand side of the device 8, to a channel waveguide formed from an optical polymer material, well known to those skilled in the art. The respective optical fibers are arranged such that the input end of the respective optical fibers is faced with the output end of the respective cores 107a of the output end of the optical waveguide 107. There are standard techniques which may be used for fiber placement on the silicon substrate 30. As an example, optical fibers can be attached using V-grooves formed on the silicon substrate 30, or any other technique known to those skilled in the art. In cases of substrates other than silicon substrate, fiber placement can be performed by other methods well known to those skilled in the art.

The channel waveguide is terminated with waveguides 101a1 and 101a2, as best shown at the left side of FIG. 1. The waveguides 101a1 and 101a2, as well as micro lenses 102a1 and 102a2, are formed from the same material used for the optical polymer core layer 40. The micro lenses 102a1 and 102a2 focus the diverging light beam coming out of the waveguides 101a1 and 101a2 into an in-plane parallel beam, which will propagate through the device 8. Since the propagating light modes are confined vertically in both polymer lens 102a1 (or 102a2) and the LN slab waveguide 14, there is no need for vertical focusing of the beam. Changing the lens radius of curvature enables variation of the focal length of the micro lenses 102a1 and 102a2. The focal length of the micro lenses 102a1 and 102a2 should be adjusted to compensate the beam divergence as it comes out of a part of the channel waveguides.

The channel waveguides preferably comprise three layers of an optical polymer material. More specifically the channel waveguides include a waveguide and micro-lens combination and an output waveguide. The low clad polymer layer 32 and the LN block 12 also are part of the channel waveguides. The first layer of the channel waveguides at the waveguide and micro-lenses combination is a lower cladding layer 38a with a lower refractive index.

The second layer of the waveguide and micro-lenses combination is the waveguide core with a refractive index higher than that of the lower cladding layer 38a. The second layer 38c of the waveguide and micro-lenses combination includes the waveguides 101a1 and 101a2 and the micro lenses 102a1 and 102a2 as the collimating lenses. Furthermore, the second layer 38c includes the clad layer 101b, the convex lens portion 102c having a high refractive index, and the portion 102d having a low refractive index as shown in FIG. 5.

The third layer of the waveguide and micro-lenses combination is an upper cladding layer 38b with a refractive index lower than that of the second layer 38c, which may be called a core layer and may be the same as or similar to the first layer 38a. In the structure shown in FIG. 1, the third layer 38b is disposed onto the second layer 38c. The lower and upper cladding layers 38a and 38b may be formed from the same polymer material with an identical refractive index. However, the refractive indexes may be different.

As similar to the waveguide and micro-lenses combination, the first layer of the output waveguide is a lower clad polymer layer 42a, and the second layer thereof is a polymer core layer 40, and the third layer thereof is an upper clad polymer layer 42b. The lower and upper clad layers 42a and 42b are formed from the same polymer material with an identical reflective index that is lower than that of the core layer 40. The second layer of the output waveguide includes focusing lenses 106a and 106a, each constructed from the convex lens portion 106c, the low refractive index portion 106d, the optical waveguides 107a and 107a, and the clad layer 107b (all as best shown in FIG. 5).

The lower cladding layers 38a, 32, and 42a are preferably polyimide layers and are deposited directly on the silicon substrate. The LN deflector block 12 is placed over the low cladding polymer layer 32 with the slab waveguide 14 at the bottom of the LN block 12. In this case the LN slab waveguide 14 is self-aligned with the core of the microlenses 102a1 and 102a2, namely the second layer 38c, and the core layer 40.

Bottom electrodes 34a1, 34a2, 36b1, and 36b2 for the deflectors 103a1, 103a2, 105a1, and 105a2, as well as the corresponding wirings for the bottom electrodes 34a1, 34a2, 36b1, and 36b2, are made and placed over the first polymer layer 32 in accordance with procedures well known in the art. The bottom electrodes 34a1, 34a2, 36b1, and 36b2 are preferably covered with a thin protective layer 36. The thin protective layer 36 is preferably a sputtered layer of $SiO_2$, or a similar dielectric material deposited by any suitable means. Each of the bottom electrodes 34a1, 34a2, 36b1, and 36b2 is connected to the bottom contact pads 84a1, 84a2, 84b1, and 84b2. Each of the bottom electrodes 34a1, 34a2, 36b1, and 36b2 works as the first and second lower electrodes of the prism pairs 103p and 105p, so the shape of the bottom electrodes 34a1, 34a2, and 36b2 is preferably a triangle (a wedge shape) respectively, as shown in FIGS. 5 and 6. In FIGS. 1–3, four bottom electrodes are depicted and numbered, with the number of the bottom electrodes are to be matched correspondingly with the number of the top electrodes.

The bottom electrodes 34a1, 34a2, 36b1, and 36b2 may be deposited directly under the two-dimensional Ti-diffused waveguide 14 of the LN block 12. In this alternative structural embodiment, the bottom electrodes 34a1, 34a2, 36b1, and 36b2 are then connected, e.g. with solder bumps, to the wiring for the bottom electrodes 34a1, 34a2, 36b1, and 36b2 formed on the bottom polymer layer 32.

Top electrodes 18a1, 18a2, 18b1, and 18b2, and the contact pads 16a1, 16a2, 16b1, and 16b2 connected to the top electrodes 18a1, 18a2, 18b1, and 18b2 are deposited on the LN block 12 in accordance with procedures well known in the art. The contact pads 16a1, 16a2, 16b1, and 16b2 are connected to the deflector electrodes 18a1, 18a2, 18b1, and 18b2 of the deflecting elements 103a1, 103a2, 105a1, and 105a2. In FIGS. 1–3, the contact pads 16a1, 16a2, 16b1, and 16b2 respectively connect to a top electrode of one of the deflectors within the respective deflecting elements 103a1, 103a2, 105a1, and 105a2. More specifically, contact pads 16a1, 16a2, 16b1, and 16b2 respectively electrically, conductively couple to all of the top electrodes of the deflectors within the respective deflecting elements 103a1, 103a2, 105a1, and 105a2 in an actual switching apparatus since the optical switching apparatus has only two channels, namely two input/output ports. Thus, the number of the contact pad increases dependent upon the increase of the number of the channels; namely it increases proportionally to the increase of the number of the input/output ports. In this situation, the contacts pads are separately formed such that the contacts pads are not electrically conductive with each other.

As similar to the bottom electrodes, each of the top electrodes 18a1, 18a2, 18b1, and 18b2 works as the first and second top electrodes of the prism pairs 103*p* and 105*p*. The shape of the top electrodes 18*a*1, 18*a*2, 18*b*1, and 18*b*2 is preferably a triangle (a wedge shape) respectively, as shown in FIGS. 5 and 6. In FIG. 1, three pairs of the prism pair are provided for each deflecting elements. Thus, the number of top electrodes should be six for each of the deflecting elements. In light of the number of top electrodes, the number of bottom electrodes of each deflecting elements should also be six.

The contact pads 16*a*1, 16*a*2, 16*b*1, and 16*b*2 are connected to microprocessors for controlling the switching, which are mounted in a housing in which the optical switching modules are also located. The control signal lines extended from the microprocessors increase in proportion to the increase of the number of the channels; namely the number of the input/output ports of the optical switching apparatus with optical switching modules.

All of the bottom contact pads 84*a*1, 84*a*2, 84*b*1, and 84*b*2 are connected to the common ground line (G) not shown in FIGS. 1–3. All of the deflectors used in FIG. 1 of each deflecting elements 103*a*1, 103*a*2, 105*a*1, and 105*a*2 have the same structure of the deflecting elements shown in FIGS. 5–7.

Alignment frames 44*a*, 44*b*, 46*a*, and 46*b* are formed in the lower cladding and core polymer layers 38*a*, 38*c*, 42*a*, and 40 with the same mask used for patterning of the channel waveguides and micro-lenses. The purpose of the alignment frames 44*a*, 44*b*, 46*a*, and 46*b* is engaging, positioning and alignment of the LN block 12 on the substrate 30. The output two-dimensional slab waveguide formed from three optical polymer layers 42*a*, 40, and 42*b* couples the light beam outgoing from the LN block 12 with the output fiber for further signal transmission.

The bottom and top electrodes 34*a*1, 34*a*2, 36*b*1, 36*b*2, 18*a*1, 18*a*2, 18*b*1, and 18*b*2 are mutually aligned to be on top of each other, as similar to the arrangement shown in FIGS. 5–7. The shapes of the electrodes define the active deflecting elements of a desired design. However, it should be noted that in the case of a relatively thin (about 5–25 $\mu$m) deflector, i.e., the height of the deflector block or active deflecting film deposited on a block from an electrically conductive material is small, one of the electrodes (i.e., either the top or the bottom one) can be made from a blanket conductive film, because fringing effects are minimized for thinner films.

In order to apply a control voltage to the top electrodes 18*a*1, 18*a*2, 18*b*1, and 18*b*2 as previously explained with reference to FIGS. 5–7, the contact pads 16*a*1, 16*a*2, 16*b*1, and 16*b*2 are formed on the top outside surface of the LN block 12. In order to connect the bottom electrodes 34*a*1, 34*a*2, 36*b*1, and 36*b*2 with the ground line (G), the contact pads 84*a*1, 84*a*2, 84*b*1, and 84*b*2 are formed in the area of the top surface of the silicon substrate 30 where the LN block 12 is not placed and is open for further wiring connections to the ground line (G).

Switching of modes from one input channel into one of the output channels is realized by applying voltage to the opposite electrodes, as previously described in reference to FIGS. 5–7. Without applied voltage to any of the top electrodes, the optical signal goes straight through the two dimensional Ti-diffused waveguide 14 without being deflected. The applied voltage changes the refractive index of LN (or any other electro-optic material which is used) between the top and bottom electrodes, which results in deflection of the light beam from its initial path. When the plus voltage is applied to the top electrodes of the deflecting elements 103*a*1 and the top electrodes of the deflecting elements 105*a*2, the optical signal is deflected from the deflecting elements 103*a*1 of the first channel to the deflecting elements 105*a*2 of the second channel, and also the optical signal that reaches the deflecting elements 105*a*2 is deflected to the second output port of the output waveguide.

In this manner the crossbar operation can be achieved. Although the switching device depicted in FIG. 1 has only two input channels and two output channels, there are three prism deflectors shown for each input port and there are three prism deflectors for each output port. For (2×2) configuration only one deflector per port on each of the input side and the output side is required to switch the signal between two I/O ports. More deflectors were added in FIG. 1 to show that the integrated switching device structure can be easily extended to any number of I/O ports.

The fabrication process of the optical switching device is explained with reference to FIGS. 2–3. The fabrication process for the switching device shown in FIG. 1 comprises the following three levels: (a) fabrication of the substrate with channel waveguides, micro lenses, bottom electrodes and electrical wiring (level 1); (b) fabrication of the beam deflector from a single crystal LN block, or any other type of bulk or thin film electro-optic material (level 2); and (c) assembly of the deflector block on the substrate (level 3).

Figure 2A:
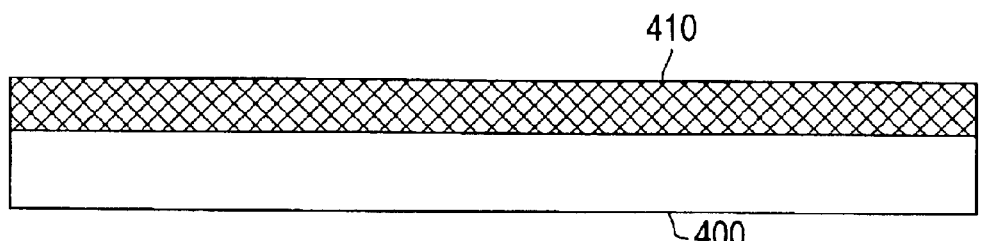
FIGS. 2(A)–2(E) illustrate a process flow of a substrate on which the deflecting device is mounted.

Level 1: Preparation of the Substrate with Channel Waveguides, Micro Lenses, Bottom Electrodes and Electrical Wiring FIG. 2 shows a schematic process flow for fabrication of the substrate on which the deflecting device is mounted. As shown in FIG. 2(A), a silicon wafer 400 is provided for use as a substrate. The silicon wafer 400 may be with or may not be with a thin silicon dioxide layer terminating on the surface of the substrate. Then, a low cladding layer (PL 1) 410 is deposited on the silicon wafer 400. To form the low cladding layer 410, low cladding optical polymer material is preferably spin coated on the silicon wafer 400. The thickness of the low cladding layer 410 may vary from 1 to 30 $\mu$m depending on the waveguide design. The preferable thickness of the low cladding layer 410 for one embodiment would be in the range 5–15 $\mu$m.

Figure 2B:
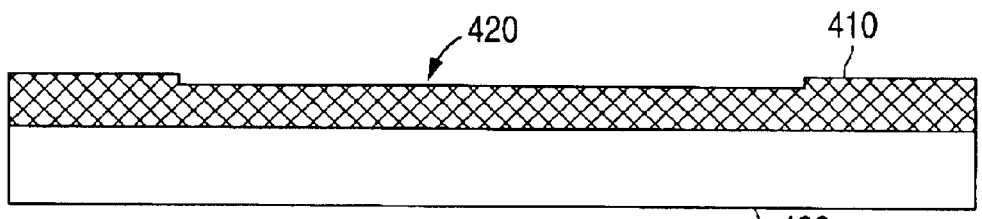

As shown in FIG. 2(B), recess formation process is performed. A recess 420 is formed on the top surface of the spin coated low cladding layer 410. In this process, the silicon wafer 400 is first coated with photoresist (PR, not shown in FIG. 2) and is patterned with photolithography. An etching process, e.g., $O_2$ plasma-etching process is applied to form the recess 420 through the opening in the masking photoresist layer. This step is for vertical leveling of the polymer waveguide cores 38*c* and 40 and the LN slab waveguide core 14. This step is optional and can be skipped if a slight misalignment is not critical for the mode coupling at the waveguide/deflector block interface.

Figure 2C:
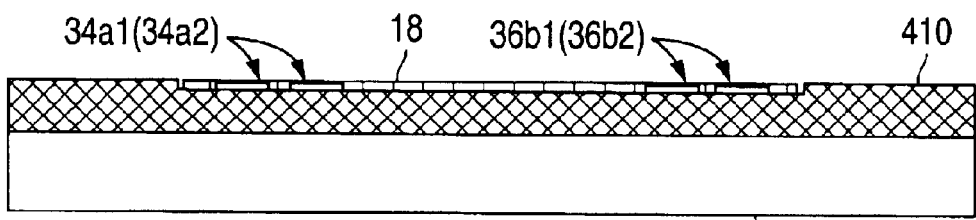

In FIG. 2(C), the bottom electrodes 34*a*1, 34*a*2, 36*b*1, and 36*b*2 and the contact pads 84*a*1, 84*a*2, 84*b*1, and 84*b*2 with the wiring, not shown in FIG. 1, are formed on the bottom surface in the recess 420. Metal layer(s) are deposited on the bottom cladding surface 410 to form bottom electrodes, contact pads, and the wiring. The deposition of the metal layers may be by sputtering or plating or any other suitable way. Any electrically conductive material can be used as the bottom electrodes, the contacts pads, and the wiring. Main restrictions for the material to be used as the metal layers are compatibility with the underlying polymer layer and the material etching possibilities. Furthermore, the bottom electrodes can be deposited directly on the under surface of the LN block 12 in the integration level 2 as will be explained later. In this process, the photoresist is applied over the low cladding layer 410 and patterned with photolithographically. The metal pattern for the metal layers is formed through the mask by either wet or dry etch. A lift-off process, well known to those skilled in the art, may also be used to form the metal pattern.

As shown in FIG. 2(C), deposition of the bottom electrode (BE) protection layer 18 is done. This is an arbitrary step and may not be necessary if there is no need to protect the BE. The protection layer 18 protects the bottom electrodes 34a1, 34a2, 34b1, and 34b2 from corrosion and shorting during the operation at higher voltages. The protection layer 18 is formed by using sputtering technology. The protection layer 18 is made of $SiO_2$ or any other appropriate dielectric material. It is a thin $SiO_2$ layer; preferably having a thickness ranging from about 0.1 to about 5.0 $\mu$m.

The BE protection layer 18 has a pattern matching the shape of the LN block 12. The process of forming the protection layer 18 includes, as similar to the other process, deposition of photoresist layer onto the low cladding layer to cover the bottom electrodes, and photolithography. For instance, the $SiO_2$ protection layer 18 may be dry etched in $CF_4/H_2$ plasma or any appropriate wet or dry etching method. Addition of the reducing agent $H_2$ in the $CF_4$ plasma allows increase of the etch selectivity between silica and the polymer of the low cladding layer 410.

Figure 2D:
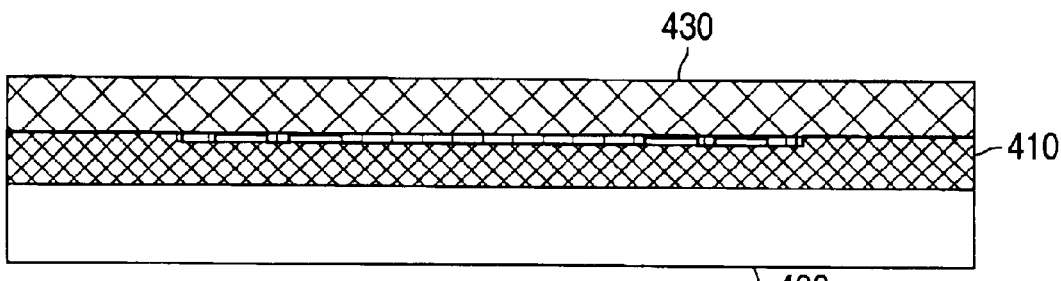

As shown in FIG. 2(D), the next step is a spin coating deposition of the core polymer layer 430 having a higher refractive index than that of the bottom-cladding layer 410. The thickness of the core polymer layer 430 can be varied according the design rules from about 1 $\mu$m to about 30 $\mu$m. The preferable thickness range for the core polymer layer is about 3–10 $\mu$m.

Figure 2E:
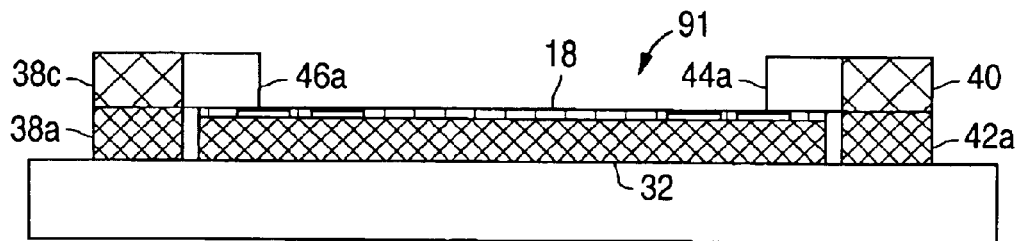

As shown in FIG. 2(E), the core and bottom cladding layers 410 and 430 are patterned through photolithography with a single mask using for example $O_2$ plasma etch. The channel waveguide core 38c including the micro lenses 102a1 and 102a2, the alignment frame 44a, 44b, 46a, and 46b, and the output waveguide core 40 are formed in the two polymer layers 410 and 430.

The upper cladding layers 38b and 42b possessing a low refractive index material are deposited and patterned in the same manner as the lower cladding and core layers so as to open the front side of the micro-lenses and the output slab-waveguide. The top plane view of the polymer waveguide and micro-lenses is similar to the top plane view of the output waveguide as shown on the right side of FIG. 1(A). If required, grooves or trenches for placing optical fibers may be formed on the substrate 400 at the left side of the polymer waveguides and micro-lenses, and at the right side of the output waveguide for fiber placement.

Level 2: Preparation of the LN Block for the Light-deflecting Device

FIG. 3 shows a process flow of fabrication of the deflecting device. As mentioned above, this is an example of a deflector block fabrication and it is not restricted to LN. Any other bulk or thin film material with OE properties may be used.

In FIGS. 3(A) and (B), in order to fabricate the LN deflecting device in this example, a 100 or 75 mm z-cut LN wafer 500 is prepared. The thickness of the wafer 500 maybe either about 1 or about 0.5 mm depending on the handling and polishing convenience of the wafer 500. Such LN wafer (LNO crystals) is available from Crystal Technologies, Inc.

Using the LN wafer 500 rather than sputtering it onto a substrate is cost effective. The thickness of the common waveguide 104 and the slab type waveguide 103b required in the optical switching apparatus is relatively high. The two dimensional (2D) waveguides 14 are formed on top of the LN wafer 500 by titanium indiffusion. The processing conditions such as Ti-layer thickness, annealing time and temperature can be adjusted according to the required waveguide design that depends on the wavelength of the light used. In a preferred embodiment, Ti-layer 510 of 700 Å thickness is blank sputtered on the −Z surface of the LN wafer 500, as shown in FIG. 3(A). Then, Ti indiffusion is performed in an annealing furnace at a temperature of 1050° C. for 8 hours, as shown in FIG. 3(B). The resulting Ti-diffused waveguide 520 was simulated to support only single mode propagation for a 1.3–1.5 $\mu$m light. The insertion losses are expected to be less than 0.5 dB/cm.

In the next step as shown in FIG. 3(C), a thin $SiO_2$ film 530 is deposited on the surface of the LN wafer 500. The thickness of the thin $SiO_2$ film 530 is 0.1–1 $\mu$m. It may be less than 0.1 $\mu$m. The thin film layer 530 serves as an isolation of the Ti-diffused waveguide 14 from the prism electrodes 34a1, 34a2, 34b1, and 34b2, and also as the upper cladding layer for the LN slab waveguide 14.

As shown in FIG. 3(C), the LN wafer 500 is then diced into blocks which are going to be used as active elements in deflecting devices. In the dice or cleave step, the silicon substrate 30 is severed to many pieces of the desired device shape. The dicing or cleaving procedure may also be applied at any earlier stage of the processing, depending on the general requirements. Obviously, the outside dimension of the LN block separated matches with the open space formed by the alignment blocks 44a, 44b, 46a, and 46b with manufacturing allowances.

As shown in FIG. 3(D), the front and rear sidewalls of the severed LN block 540 are polished with an optical quality for coupling of incoming and outgoing light modes. In the next step shown in FIG. 3(E), the LN block 540 may be thinned by backside lapping and polishing. The block thickness may be in the range 10–500 $\mu$m. Since LN is a very brittle material, the limitation on the block thickness are imposed from handling and processing difficulties.

After the blocks are thinned, as shown in FIG. 3(F), a metal film 550 is sputtered on the surface of the LN block 540 for making the top electrodes, the contact pads, and the wiring for the top electrodes and the contact pads.

FIG. 3(F) shows a side view of the final form of the LN block 540 with the Ti indiffused slab waveguide 520 and the metal layer 550 for the top electrodes, etc. After forming the metal layer 550 by sputtering on the backside (in FIG. 3(F) it is the topside) of the LN block 540, a photoresist layer is rolled on the topside of the LN block 540. Then, lithography is performed and the metal layer is etched to form the top electrodes on the LN block 540.

Level 3: Assembly of the Deflector Block on the Substrate

The LN block 540 is inserted into the alignment frame 44a, 44b, 46a, and 46b formed in the polymer layers 410 and 430. The placement of the block 540 may be realized by the flip-chip bonding technique. The LN block 540 is attached to the substrate made through the process shown in FIG. 2 with an adhesive material and leveled and registered in order to adjust the polymer and LN waveguides. The adhesive material is, e.g., an epoxy material. It is coated to the under surface of the LN block 540, preferably the surface of thin $SiO_2$ film layer 530.

By the practice of the present invention there is provided a hybrid integration on a single substrate of the switching matrix and two-dimensional micro-optics. The switching matrix is fabricated from a single block electro-optic material which incorporates cascaded light beam deflecting elements for the input channels, slab waveguide for non-blocking transmission of the signal between the input/output deflectors, and output deflecting elements to couple the rerouted signals into the output waveguides. Two-dimensional micro-optics made from optical polymer layers for coupling of the input and output fibers in and out of the switching matrix. The principles of the present invention are based on electro-optic switching principle; i.e., there is high potential for very fast switching (~40 Gb/s and higher). A 2×2 switch fabricated with the technique of embodiments of the present invention was measured to have a switching speed of less than about 50 microseconds. There are no movable switching parts; thus, the present invention is highly durable and reliable. There are no heating electrodes, thus there are no thermal management problems. The present invention has a high compatibility with existing semiconductor processing techniques and equipment, and the switching matrix on a single block allows low cost fabrication of deflectors for a large number of I/O channels. Several switching devices may be fabricated on a single wafer, and thus, there would be a high yield at a lower cost.

It is to be understood that this invention is not limited to those embodiments and modifications described in the specification. Modifications and variations can be made one skilled in the art without departing from the sprit and scope of the invention. Moreover, any one or more features of any embodiment of the invention may be combined with any one or more other features of any other embodiment of the invention, without departing from the scope of the invention.

What is claimed is:

1. A method for producing an optical substrate assembly comprising:

providing substrate;

disposing a first cladding layer on the substrate;

forming a first recess in the first cladding layer;

disposing a plurality of first deflector electrode assemblies in said first recess;

disposing a core layer on the first cladding layer and over the first electrode assemblies, and forming microlenses in the core layer to produce an optical substrate assembly.

2. The method of claim 1 additionally comprising forming an alignment frame assembly in the core layer.

3. The method of claim 2 wherein said forming an alignment frame assembly includes etching openings in the first cladding layer down to the substrate.

4. The method of claim 3 wherein said openings border on said first recess.

5. The method of claim 2 wherein said alignment frame assembly includes a plurality of spaced corner assemblies.

6. The method of claim 3 wherein said alignment frame assembly includes a plurality of spaced corner assemblies.

7. The method of claim 4 wherein said alignment frame assembly includes a plurality of spaced corner assemblies.

8. The method of claim 1 additionally comprising depositing a protective layer in said first recess.

9. The method of claim 7 additionally comprising depositing a protective layer in said first recess.

10. A method for producing an optical substrate assembly comprising:

providing a substrate;

disposing a first cladding layer on the substrate;

forming a plurality of recesses in the first cladding layer;

disposing a plurality of first deflector electrodes assemblies in said recesses;

disposing a core layer on the first cladding layer and over the first electrode assemblies; and forming microlenses in the core layer to produce an optical substrate assembly.

* * * * *